US008219885B2

(12) United States Patent
Bradley et al.

(10) Patent No.: US 8,219,885 B2
(45) Date of Patent: Jul. 10, 2012

(54) ERROR DETECTING AND CORRECTING MECHANISM FOR A REGISTER FILE

(75) Inventors: Daryl Wayne Bradley, Willingham (GB); Jason Andrew Blome, Brooklyn, NY (US); Scott Mahlke, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 764 days.

(21) Appl. No.: 12/226,108

(22) PCT Filed: Aug. 15, 2006

(86) PCT No.: PCT/GB2006/003044
§ 371 (c)(1),
(2), (4) Date: Apr. 7, 2009

(87) PCT Pub. No.: WO2007/132136
PCT Pub. Date: Nov. 22, 2007

(65) Prior Publication Data
US 2009/0292977 A1    Nov. 26, 2009

Related U.S. Application Data

(60) Provisional application No. 60/799,678, filed on May 12, 2006.

(51) Int. Cl.
*G06F 11/00* (2006.01)
(52) U.S. Cl. .......................................... 714/766; 714/15
(58) Field of Classification Search .................. 714/776, 714/780, 751, 753, 699, 15, 48, 49, 50, 766
See application file for complete search history.

(56) References Cited

U.S. PATENT DOCUMENTS

| 3,544,777 | A    | 12/1970 | Winkler |
| 5,905,854 | A *  | 5/1999  | Nielson et al. ............... 714/6.12 |
| 6,240,509 | B1 * | 5/2001  | Akkary ......................... 712/228 |
| 7,178,005 | B1 * | 2/2007  | Jordan et al. .................. 711/217 |
| 7,320,063 | B1 * | 1/2008  | Grohoski et al. ............. 712/214 |

(Continued)

OTHER PUBLICATIONS

International Search Report for PCT/GB2006/003044, mailed May 29, 2007.

(Continued)

*Primary Examiner* — Dieu-Minh Le
(74) *Attorney, Agent, or Firm* — Nixon & Vanderhye P.C.

(57) ABSTRACT

A data processing system includes a register file having a plurality of registers storing respective register data values and an associated register value cache having a plurality of storage locations storing corresponding cache data values. There are fewer cache data values than registers. When a register is to be read, both the register data value and, if present, a cache data value from a corresponding storage location within the register value cache are read and compared by a comparator. This generates a match signal which indicates if the data values do not match that one of the data values is in error. The match signal stalls the processing and a CRC code initially stored with the cache data value and recalculated based upon the read cache data value are compared to determine whether or not the cache data value has changed since it was stored. If the cache data value has not changed, then it is correct and is output instead of the register data value. Alternatively, if the cache data value has changed, then the register data value is output.

25 Claims, 5 Drawing Sheets

U.S. PATENT DOCUMENTS

Figure 1:
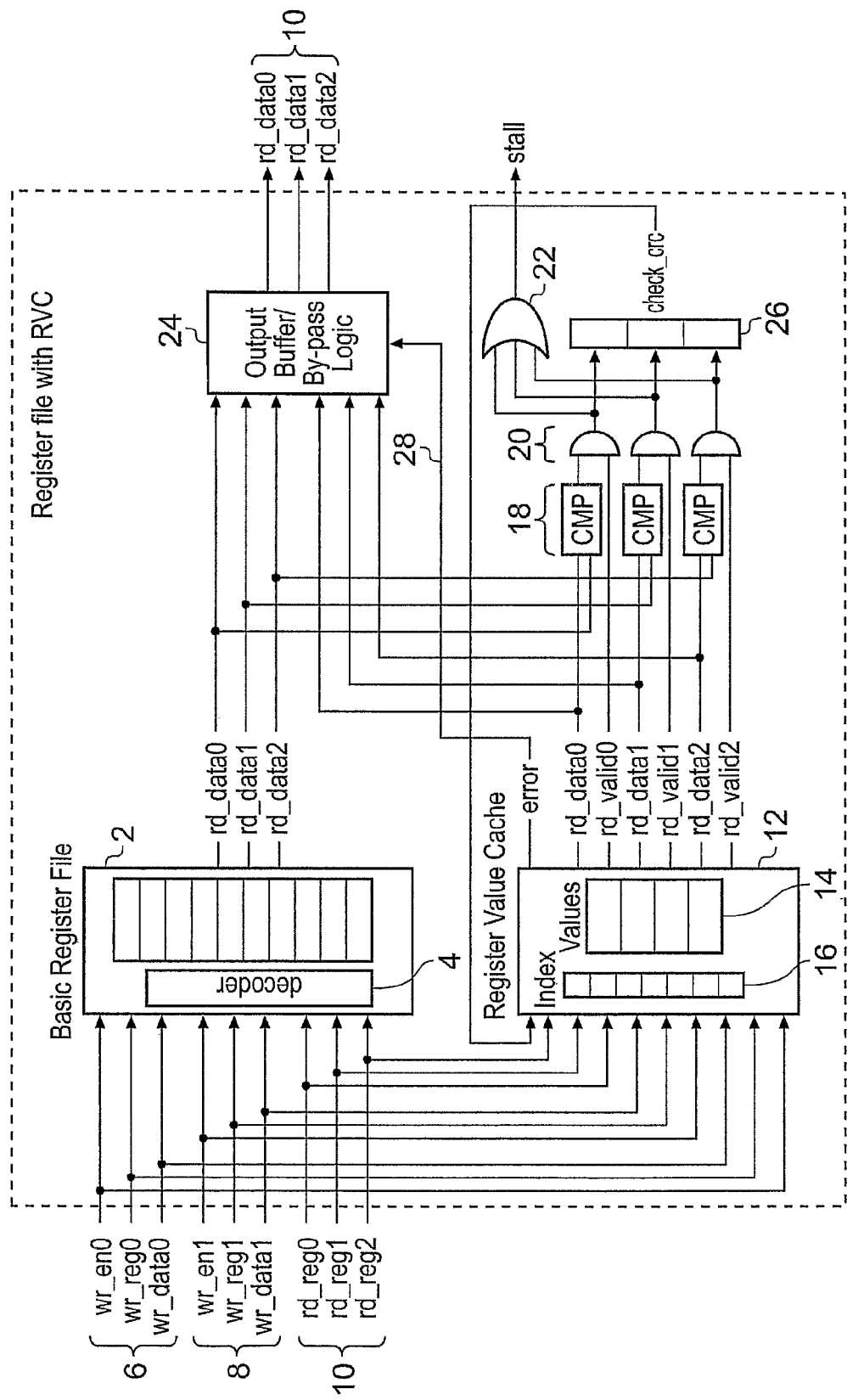

| | | | |
|---|---|---|---|
| 7,676,655 B2 * | 3/2010 | Jordan | 712/214 |
| 7,702,887 B1 * | 4/2010 | Grohoski et al. | 712/227 |
| 2004/0225928 A1 | 11/2004 | Miyagi | |
| 2006/0190702 A1 * | 8/2006 | Harter et al. | 712/15 |

OTHER PUBLICATIONS

Written Opinion of the International Searching Authority for PCT/GB2006/003044.

* cited by examiner

ERROR DETECTING AND CORRECTING MECHANISM FOR A REGISTER FILE

This application is the U.S. national phase of International Application No. PCT/GB2006/003044, filed 15 Aug. 2006 which designated the U.S. and claims priority to US 60/799,678, filed 12 May 2006, the entire contents of each of which are hereby incorporated by reference.

The technology relates to the field of data processing systems, and more particularly, to data processing systems having a register file and incorporating a error detection and error correcting mechanism therefore.

There is an increasing drive towards utilizing integrated circuit geometries of a smaller size operating at lower voltage and in more physically demanding conditions. This makes such integrated circuits more prone to the occurrence of so called "soft errors". Soft errors can arise due to radiation particle strikes or unexpected voltage pulses in operation. These soft errors can cause a bit value within the integrated circuit to inappropriately change and this error can propagate through the integrated circuit and have an effect upon the output or stored state of that integrated circuit, such that the output or stored state becomes erroneous.

At the same time as the above trends are making integrated circuits increasingly prone to soft errors, there also exists a desire for highly reliable integrated circuits, such as for use in safety critical systems, e.g. vehicle airbag control, vehicle braking, aircraft control etc. Within such environments a high degree of fault tolerance and/or fault correction is desirable. It is also the case that the increase in soft error rate means there is a lot of interest in applying these techniques to integrated circuits not used in safety critical systems as well. At the same time, it is also desired to gain the benefits from smaller integrated circuit geometries and lower operating voltages, such as increased circuit density, lower power consumption and the like.

One aspect of the technology provides apparatus for processing data, said apparatus comprising:

a register file having a plurality of registers for storing respective register data values;

a cache having a plurality of storage locations for storing respective cache data values corresponding to register data values stored within said register file;

a comparator coupled to said register file and to said cache and responsive to a register data value read from said register file and a corresponding cache data value read from said cache to generate a match signal indicating whether said register data value matches said cache data value; and a value selector responsive to said match signal indicating that said register data value does not match said cache data value to determine which of said register data value and said cache data value is correct and to select for output a correct one of said register data value and said cache data value.

This technique recognises that the register file storing register data values represent a particular vulnerability to soft errors and accordingly a strong advantage in return for expended overhead in providing soft error protection for such register data values. Furthermore, the present technique uses a cache to store copies of the register data values for comparison with the register data values as they are read from the register file. Compared to simply providing error correcting codes on the register file which protects against changes in the values stored in the register file whilst they are resident therein, this cache technique is also able to detect errors and correct errors occurring during the writing in of data values to the register file and during the reading of data values from the register file. This advantageously enhances the soft error protection associated with the register data values.

Whilst it would be possible to form the cache in a variety of different ways, a particularly flexible form of a cache well suited for scaling to match the desired level of protection to be achieved is one in which the cache stores an index value with each cache data value indicating to which of the register data values that cache data value corresponds. This allows a flexible mapping between storage location within the cache and the register of the corresponding register data value.

The present technique also recognises that in real systems a high proportion of the benefit to be gained from soft error protection of the register data values can be achieved with a cache having fewer storage locations than there are registers within the register file (although providing storage locations for each register would be possible). This advantageously reduces the overhead associated with the provision of the cache and other portions of the protection mechanism. In particular, this aspect recognises that the most frequently accessed and used register data values are the ones which give rise to the greatest vulnerability to soft errors in terms of their potential impact on the rest of the system, and are the ones which are most justified in being subject to soft error protection in this way. Never or infrequently accessed register values represent less of a vulnerability due to reduced usage and may not justify the provision of cache storage locations and associated circuitry to protect.

The determination of which of the register data value and the cache data value is in error if they do not match can be achieved in a variety of different ways. One way of achieving this is to use redundant data checking codes associated with one of the register data value and the cache data value. These redundant data checking codes, which may be cyclic redundancy checking codes, will indicate if their associated data value has changed and accordingly which of the register data value and the cache data value is correct, when the data is read.

The impact of the error protection mechanisms upon the performance of the normal data paths can be reduced in embodiments in which if the match signal indicates that the register data value does not match the cache data value, then output of a data value is delayed and the value selector is triggered to perform the determination and selection in a following processing cycle. This offloads the determination and the selection from the normal read path.

The present technique is particularly well suited to register files having multiple access ports since it is hardware inefficient to provide alternative mechanisms, such as dedicated ECC circuitry, associated with each of those ports used for writing to the register file. The present technique may be used with advantage in register files comprising three read ports and two write ports.

Whilst it will be appreciated from the above that these techniques provide a degree of protection against soft errors, they may also provide either separately or in combination, protection against permanent errors. As an example, if a particular bit storage location within a register file develops a permanent fault, then the cache would provide a mechanism for overcoming this defect so that the integrated circuit concerned would still be usable.

In preferred embodiments a storage location within said cache (a cache line) may be locked down to store a value corresponding to the value which should be stored in a register with a detected permanent error.

A significant practical enhancement to the present technique is one in which a read buffer is coupled to the register file and the cache to store a register data value and a cache data value during operation of the value selector thereby permitting the original sources to be overwritten in the normal way for a multiple port register file.

The present techniques are usable with advantage in integrated circuits comprising microprocessors responsive to program instructions to perform data processing operations.

Another aspect of the technology provides a method of processing data, said method comprising the steps of:

storing register data values within respective ones of a plurality of registers of a register file;

storing cache data values corresponding to register data values stored within said register file within respective ones of a plurality of storage locations of a cache;

in response to a register data value read from said register file and a corresponding cache data value read from said cache, generating a match signal indicating whether said register data value matches said cache data value; and in response to said match signal indicating that said register data value does not match said cache data value, determining which of said register data value and said cache data value is correct and selecting for output a correct one of said register data value and said cache data value.

Figure 2:
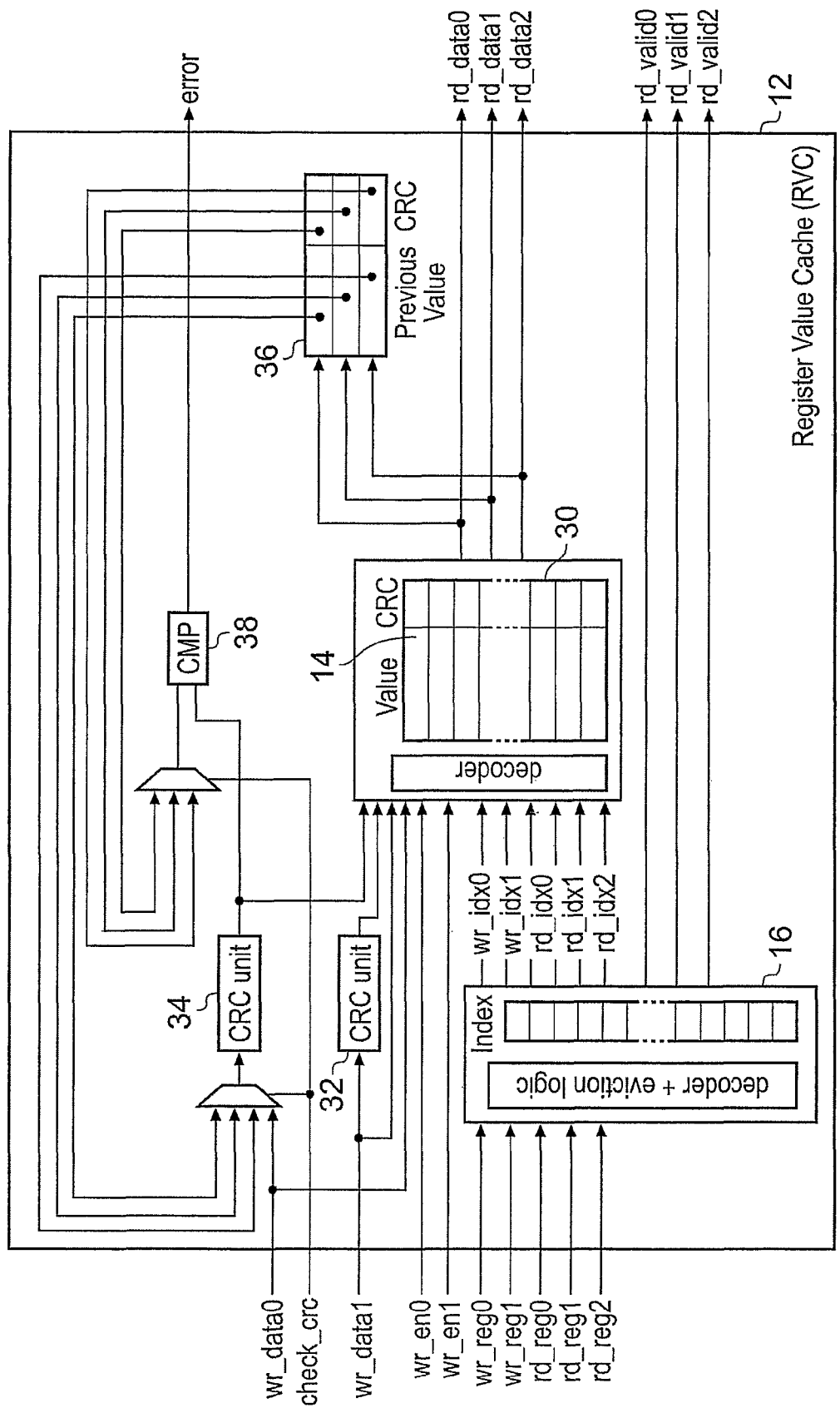
Figure 3A:
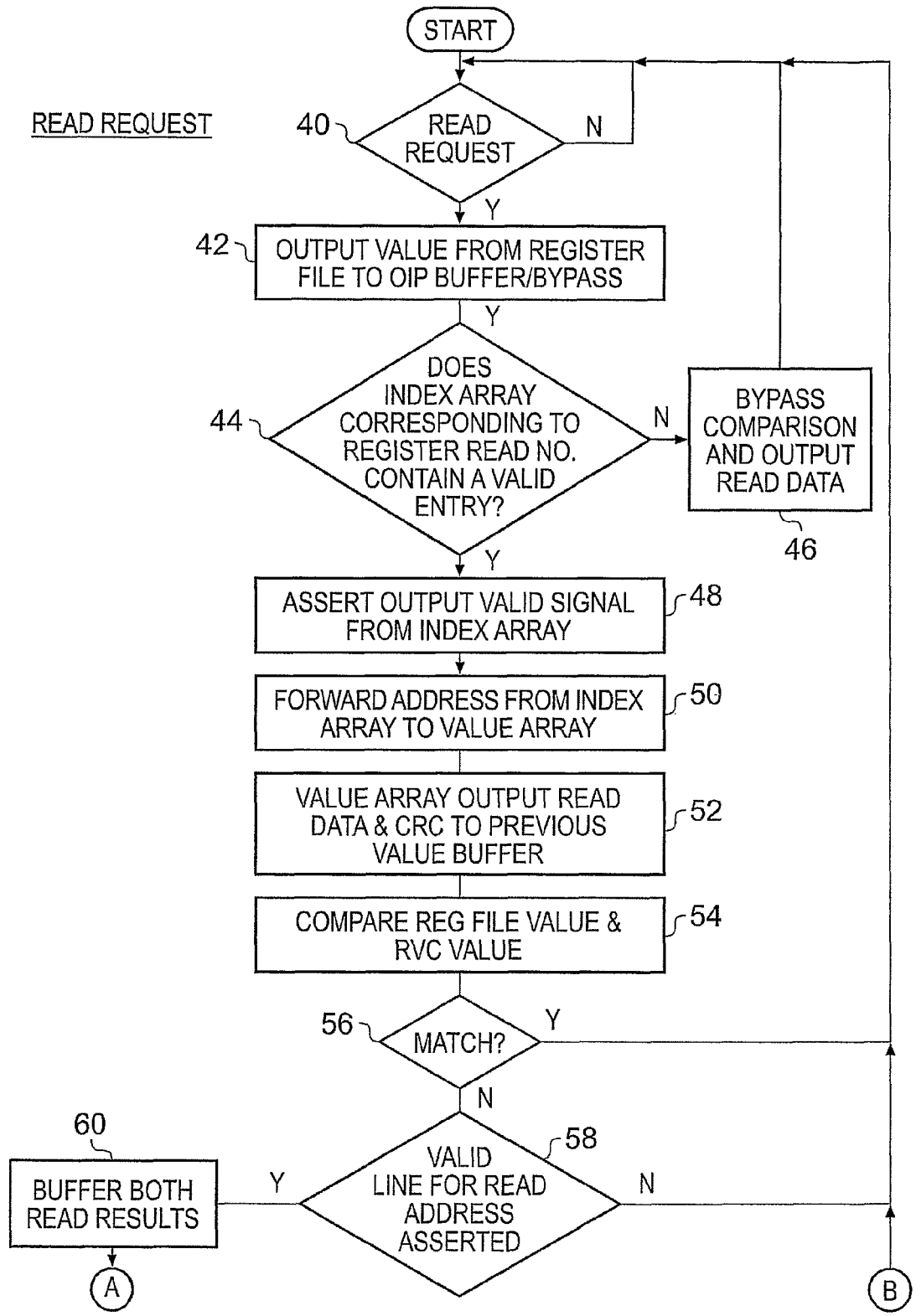
Figure 3B:
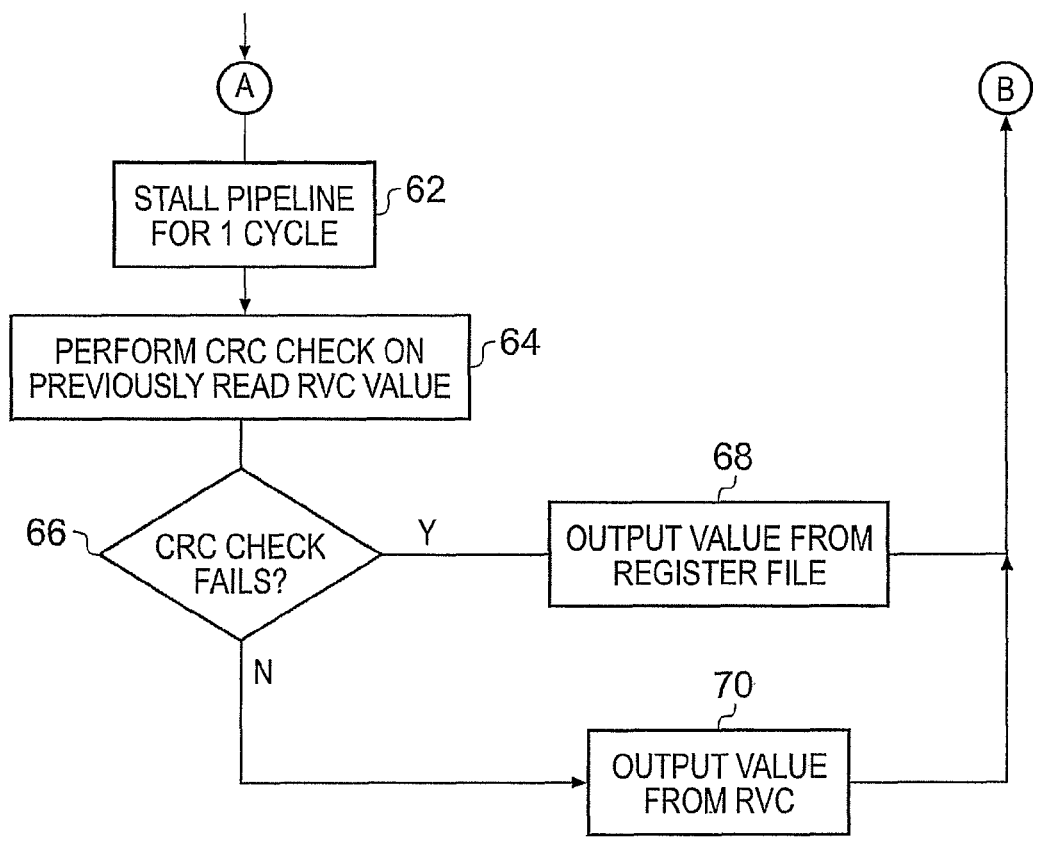
Figure 4:
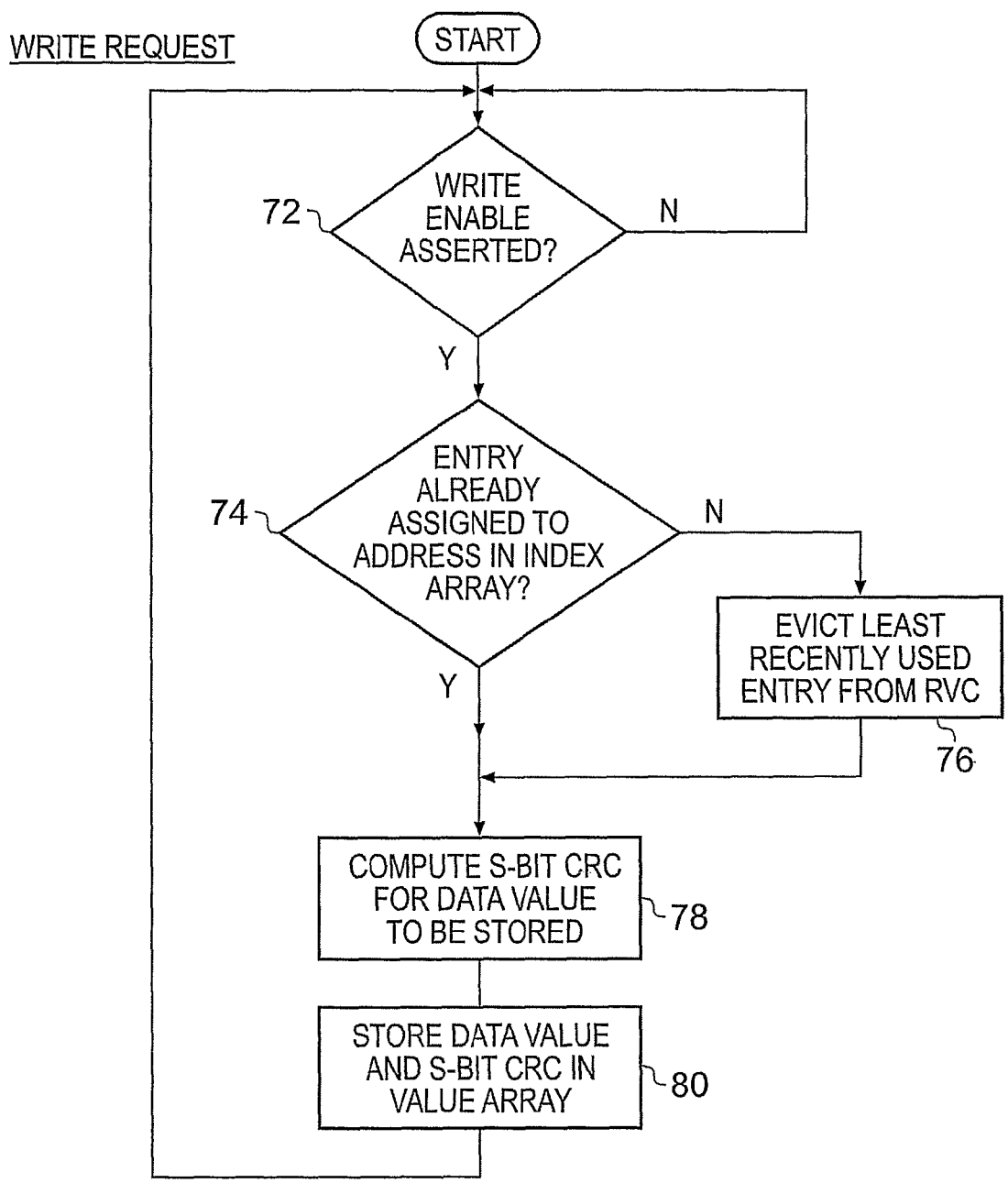

Non-limiting embodiments will now be described, by way of example only, with reference to the accompanying drawings in which:

FIG. 1 schematically illustrates a portion of a data processing system including a register file and a register value cache;

FIG. 2 schematically illustrates a register value cache in more detail;

FIGS. 3A and 3B are a flow diagram schematically illustrating the processing of a read request; and FIG. 4 is a flow diagram schematically illustrating the processing of a write request.

FIG. 1 illustrates a portion of a data processing apparatus, such as a microprocessor for performing data processing operations in response to program instructions. It will be appreciated that such data processing apparatus typically includes many elements and the register file and register value cache illustrated in FIG. 1 are only one portion of such an apparatus. The other portions of this apparatus may also be subject to soft/permanent error protection mechanisms to provide a degree of protection against soft or permanent errors using similar or different techniques.

The data processing system includes a register file 2, which includes a plurality of registers each storing a respective register data value. These may be 32-bit register data values stored in 37 registers, as is the case in microprocessors of the type designed by ARM Limited, Cambridge, England. A decoder 4 within the register file 2 serves to decode a register specifying field and provide access to the appropriate register. As will be seen in FIG. 1, there are two write ports 6, 8 to the register file 2 and three read ports 10. The register file 2 as shown in FIG. 1 can be substantially conventional.

Also shown in FIG. 1 is a register value cache 12. The register value cache 12 includes a plurality of storage locations 14 for storing respective cache data values corresponding to register data values stored within the register file 2. Index values 16 are stored corresponding to the register of the register file 2 and indicating in which storage location 14, if any, a cache data value corresponding to that register data value is stored. It will be seen in FIG. 1 that there are fewer storage locations within the register value cache 12 than there are registers within the register file 2. It would be possible to provide a storage location 14 for each register of the register file 2, but in practice the law of diminishing returns applies and once a certain number of storage locations are provided to give soft error or permanent error protection to the most active of the registers of the register file 2, then providing additional storage locations within the register value cache 12 provides comparatively little additional advantage.

As will also be seen in FIG. 1, the register value cache 12 receives as its inputs the illustrated inputs supplied to the register file 12, namely those from the two write ports 6, 8 and the read register specifiers from the three read ports 10. Within the register value cache 12 a received register specifier for a read operation is used to lookup a corresponding index value 16 indicating whether and where a cache data value corresponding to the register data value for the register being read is stored within the register value cache 12. If such a value is stored, then it is output on the corresponding read data line from the register value cache 12 together with a valid signal indicating that it is so stored and is being so output.

When a write operation is being performed into the register file 2, then the register specifier for the register being written is also passed to the register value cache 12 and a lookup is made into the stored index values 16 to see whether that register is already subject to having a corresponding cache data value stored within the register value cache 12. If a storage location 14 is already allocated to that register, then the cache data value therein is overwritten by the new data value being written to the corresponding register in the register file 2. If a storage location within the register value cache 12 is not already allocated, then a least recently used algorithm can be employed to select a storage location within the register value cache to be overwritten with the cache data value corresponding to the register data value and the index 16 for that storage location updated to correspond to the new register.

The read data outputs from the register value cache 12 are supplied to a bank of comparators 18 which perform for each read port a bit-by-bit comparison between the cache data value returned from the register value cache 12 and the corresponding register data value returned from the register file 2. The result of this comparison is subject to a logical AND operation by one of the AND gates 20 (which are ANDs across a bus and not a single 1-bit AND) so as to generate three match signals which are logically ORed by an OR gate 22 to produce a stall signal. If the match signals indicate that the cache data value and a corresponding register data value do not coincide, then the stall signal serves to stall the processor until an appropriate determination of which of the register data value and the cache data value is correct can be made and this correct value selected for output. Accordingly, a read buffer 24 is provided for buffering the register data values and the cache data values.

Cyclic redundancy check latch 26 associated with each of the read ports is used to latch a requirement to perform a CRC check on the cache data value of that read port and this is fed back to the register value cache 12 where it is used to recalculate a new CRC value which is compared with a CRC code which was stored in the register value cache 12 when the cache data value was initially written into the register value cache 12. If the CRC codes do not match, then this indicates that the cache data value has been subject to a change and accordingly it is the cache data value which is in error. This is signalled to the read buffer 24 by an error signal line 28 and is used to select the register data value as the correct data value for output. Conversely, if the comparison of the CRC codes indicates that no change has occurred in the cache data value, then this indicates that it is the register data value which is in error and accordingly the cache data value is selected for output by the read buffer 24.

It will be appreciated from the above that the example of FIG. 1 has been described in the context of the cyclic redundancy data checking codes being associated with the register value cache 12, but these elements could additionally or alternatively be provided in association with the register file 2. The OR gate 22, the CRC latch 26, the subsequent CRC recalculation logic and the read buffer 24 together provide the action of a value selector by determining which of the cache data value and the read data value is correct and then selecting this correct value for output.

FIG. 2 schematically illustrates the register value cache 12 in more detail. The storage positions of the CRC codes 30 associated with each of the cache data values can be seen next to those cache data values. These CRC codes are generated by CRC logic 32, 34 as those cache data values are written into the register value cache 12. When a cache data value is output on one of the read ports it is stored within a set of registers 36 together with its initially calculated CRC code. A CRC code is then recalculated for any cache data value indicated by the CRC latch 26 (indicating a CRC check is required) using the CRC unit 34 and compared within a comparator 38 to generate an error signal indicating that it is the cache data value which is in error if the CRC codes do not match.

FIGS. 3A and 3B are a flow diagram illustrating the processing of a read request. At step 40 the system waits for a read request to be received. At step 42 a register data value is output from the register file 2 and stored in the read buffer 24. Step 44 then determines from the index value 16 for that register within the register value cache 12 whether a cache data value corresponding to that register data value is stored within the register value cache 12. If no such corresponding cache data value is stored, then processing proceeds to step 46 at which the comparison and soft error detection mechanisms are effectively bypassed and the register data value is output on the assumption that it is correct.

If the comparison at step 44 indicated that a corresponding cache data value is stored, then a valid signal is output from the array of index values at step 48 and is used to indicate that the corresponding output from the selected storage location 14 on that read port is valid. The register index indicating which of the storage locations 14 is storing the corresponding cache data value is forwarded to a decoder associated with the cache storage locations 14 at step 50 and the corresponding cache data value and associated previously calculated CRC code is output at step 52 to the read buffer 24. At step 54 the register data value and the cache data value are compared to generate a match signal. Step 56 determines whether the match signal indicates that one of the register data value and the cache data value is incorrect. If the match signal indicates that neither of the register data value or the cache data value is incorrect, then no soft error or permanent error has been detected and processing proceeds back to step 40 with the register data value or the cache data value being output from the read buffer 24.

If the determination from the match signal at step 56 was that one of the register data value and the cache data value was incorrect, then step 58 determines whether the valid line for the read address within the register value cache 12 has been asserted indicating that the cache data value is properly stored and accordingly that the match signal is representing a detection of an incorrect one of the cache data value and the register data value. If the valid line is not asserted, then processing again returns to step 40.

If the determination at step 58 is that a genuine error has been detected, then step 60 buffers both the register data value and the cache data value within the read buffer 24 and step 62 stalls the pipeline of the microprocessor for a cycle. Step 64 then recalculates the CRC value for the cache data value and compares this with the previously calculated CRC value for that cache data value as read from the register value cache 12. If the CRC values do not match as determined at step 66, then this indicates that it is the cache data value which is in error and accordingly step 68 outputs the register data value from the read buffer 24 as the correct data value. Alternatively, if the CRC comparison indicates that the cache data value is correct, then this indicates that it is the register data value which is incorrect and accordingly step 70 outputs the register data value from the read buffer 24.

FIG. 4 is a flow diagram schematically illustrating the processing performed when writing a register data value to the register file 2 and the register value cache 12. At step 72 the system waits until a write enable signal is asserted. Step 74 then determines whether or not within the register value cache 12 a storage location has already been allocated to that register as indicated in the array of index values. If a storage location has not already been allocated, then step 76 serves to evict an existing cache data value using a least recently used cache replacement algorithm. It will be appreciated that other types of cache replacement algorithm could also be used, such as round robin, random etc. Cache lines may also be locked down so as to be dedicated to storing a value corresponding to the value which should be stored in a register of the register file in which a permanent error has been detected. If the determination at step 74 was that a cache storage location had already been allocated to that register value, then step 76 is bypassed. Step 78 shows that a 5-bit CRC value is then calculated for the cache data value being written into the register value cache using one of the CRC units 32, 34. Step 80 then writes the cache data value and its corresponding initially calculated CRC value into the appropriate storage location 14.

The invention claimed is:

1. Apparatus for processing data, said apparatus comprising:
    a register file having a plurality of registers for storing respective register data values;
    a cache having a plurality of storage locations for storing respective cache data values corresponding to register data values stored within said register file, wherein said cache includes fewer storage locations than there are registers within said register file; and
    a comparator coupled to said register file and to said cache and responsive to a register data value read from said register file and a corresponding cache data value read from said cache to generate a match signal indicating whether said register data value matches said cache data value; and a value selector responsive to said match signal indicating that said register data value does not match said cache data value to determine which of said register data value and said cache data value is correct and to select for output a correct one of said register data value and said cache data value.

2. Apparatus as claimed in claim 1, wherein said cache stores an index value with each cache data value indicating to which of said register data values said cache data value corresponds.

3. Apparatus as claimed in claim 1, wherein said value selector includes a redundant data checking circuit coupled to said cache and responsive to said cache data value and an associated redundant data checking code to check for changes within said cache data value, said value selector selecting said cache data value as correct if said redundant data checking circuit indicates no changes have occurred in said cache data value and selecting said register data value as correct if said redundant data checking circuit indicates changes have occurred in said cache data value.

4. Apparatus as claimed in claim 3, wherein said redundant data check circuit is a cyclic redundancy checking circuit and said redundant data checking code is a cyclic redundancy checking code.

5. Apparatus as claimed in claim 1, wherein said value selector includes a redundant data checking circuit coupled to said register file and responsive to said register data value and an associated redundant data checking code to check for changes within said register data value, said value selector selecting said register data value as correct if said redundant data checking circuit indicates no changes have occurred in said register data value and selecting said cache data value as correct if said redundant data checking circuit indicates changes have occurred in said register data value.

6. Apparatus as claimed in claim 1, wherein if said match signal indicates that said register data value does not match said cache data value, then output of a data value is delayed and said value selector is triggered to perform said determination and said selection in a following processing cycle.

7. Apparatus as claimed in claim 1, wherein upon detection of a permanent error in a register, said as: storage location within said cache is—locked down to store a cache data value for a register data value of said register with a said permanent error.

8. Apparatus as claimed in claim 1, comprising a read buffer coupled to said register file and said cache to store said register data value read from a register and said cache data value read from a storage location during operation of at least said value selector whilst permitting said register and said storage location to be overwritten.

9. Apparatus as claimed in claim 1, wherein said register file comprises at least one of a plurality of read ports and a plurality of write ports.

10. Apparatus as claimed in claim 9, wherein said register file comprises three read ports and two write ports.

11. Apparatus as claimed in claim 1, wherein said cache, said comparator and said value selector operate to provide at least one of soft error protection and permanent error protection.

12. Apparatus as claimed in claim 1, wherein said apparatus comprises a microprocessor responsive to program instructions to perform data processing operations.

13. Apparatus for processing data, said apparatus comprising:
a register file having a plurality of registers for storing respective register data values;
a cache having a plurality of storage locations for storing respective cache data values corresponding to register data values stored within said register file; and
a comparator coupled to said register file and to said cache and responsive to a register data value read from said register file and a corresponding cache data value read from said cache to generate a match signal indicating whether said register data value matches said cache data value; and a value selector responsive to said match signal indicating that said register data value does not match said cache data value to determine which of said register data value and said cache data value is correct and to select for output a correct one of said register data value and said cache data value.

14. A method of processing data, said method comprising the steps of:
storing register data values within respective ones of a plurality of registers of a register file;
storing cache data values corresponding to register data values stored within said register file within respective ones of a plurality of storage locations of a cache, wherein said cache includes fewer storage locations than there are registers within said register file;
in response to a register data value read from said register file and a corresponding cache data value read from said cache, generating a match signal indicating whether said register data value matches said cache data value; and in response to said match signal indicating that said register data value does not match said cache data value, determining which of said register data value and said cache data value is correct and selecting for output a correct one of said register data value and said cache data value.

15. A method as claimed in claim 14, comprising storing an index value with each cache data value indicating to which of said register data values said cache-data value corresponds.

16. A method as claimed in claim 14, comprising checking for changes within said cache data value using an associated redundant data checking code, said cache data value being selected as correct if said checking indicates no changes have occurred in said cache data value and said register data value being selected as correct if said checking indicates changes have occurred in said cache data value.

17. A method as claimed in claim 14, wherein said redundant data checking code is a cyclic redundancy checking code.

18. A method as claimed in claim 14, comprising checking for changes within said register data value using an associated redundant data checking code, said register data value being selected as correct if said checking indicates no changes have occurred in said register data value and said cache data value being selected as correct if said checking indicates changes have occurred in said register data value.

19. A method as claimed in claim 14, wherein if said match signal indicates that said register data value does not match said cache data value, then output of a data value is delayed and said value said determination and said selection in a following processing cycle are triggered.

20. A method as claimed in claim 14, wherein upon detection of a permanent error in a register, said as storage location within said cache is locked down to store a cache data value for a register data value of said register with a said permanent error.

21. A method as claimed in claim 14, comprising buffering said register data value read from a register and said cache data value read from a storage location during at least said determination and said selection whilst permitting said register and said storage location to be overwritten.

22. A method as claimed in claim 14, wherein said register file comprises at least one of a plurality of read ports and a plurality of write ports.

23. A method as claimed in claim 22, wherein said register file comprises three read ports and two write ports.

24. A method as claimed in claim 14, wherein method provides at least one of soft error protection and permanent error protection.

25. A method as claimed in claim 14, wherein said method is performed within a microprocessor responsive to program instructions to perform data processing operations.

* * * * *